UNITED STATES PATENT OFFICE.

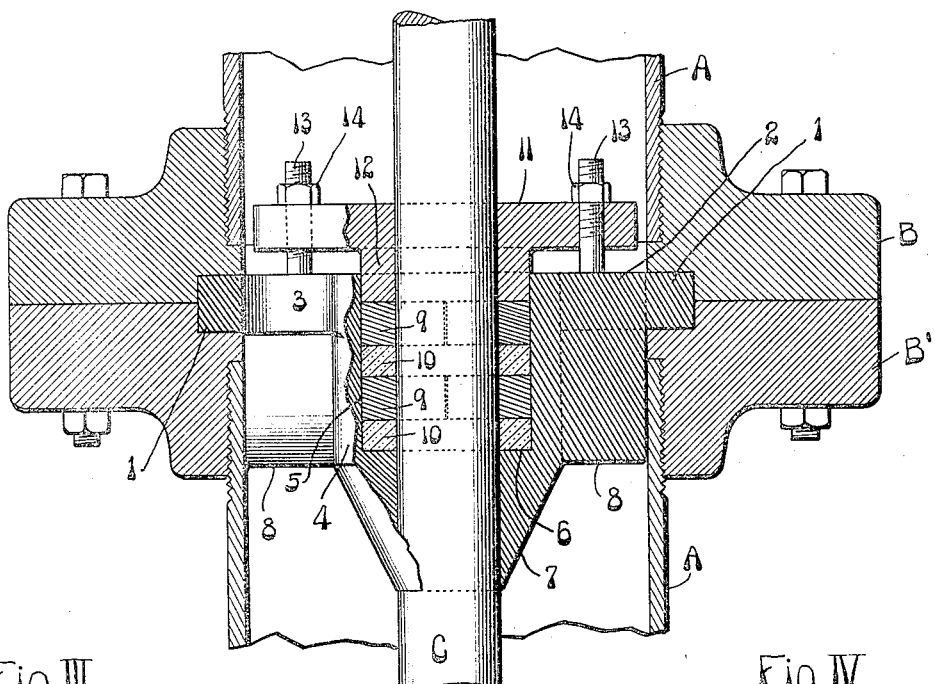
J. H. GWATHMEY.
PUMP SHAFT BEARING.
APPLICATION FILED JULY 14, 1913.
1,101,923.  Patented June 30, 1914.
Fig. I.
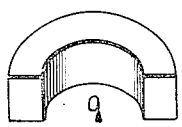
Fig. III.
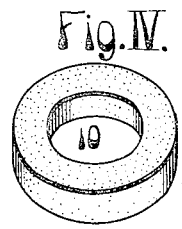
Fig. IV.
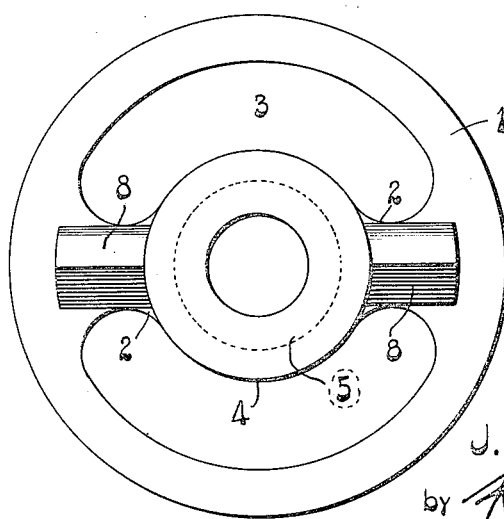
Fig. II.
Attest
a.j. m-Cauley
E. B. ———
Inventor:
J. H. Gwathmey
by Knight & Cook
Attys.

JOSEPH H. GWATHMEY, OF WEBB CITY, MISSOURI.

PUMP-SHAFT BEARING.

1,101,923. Specification of Letters Patent. Patented June 30, 1914.

Application filed July 14, 1913. Serial No. 778,932.

*To all whom it may concern:*

Be it known that I, JOSEPH H. GWATHMEY, a citizen of the United States of America, residing at Webb City, in the county of Jasper and State of Missouri, have invented certain new and useful Improvements in Pump-Shaft Bearings, of which the following is a full, clear, and exact description, reference being had to the accompanying drawings, forming a part of this specification.

My invention relates to a bearing for the shafts of centrifugal pumps, and it has for its object the production of a shaft bearing supported by the pump tubing, the bearing including absorbent antifriction rings lubricated by moisture from water passing through the pump tubing, and means for so confining the antifriction rings as to prevent the flow of water between them and the pump shaft.

Figure I is a vertical section through fragments of adjoining pump tubing sections, the connections therefor, and my bearing. Fig. II is an inverted plan view of my bearing. Fig. III is a perspective view of one of the segments of the wooden antifriction rings of my bearing. Fig. IV is a perspective view of one of the leather antifriction rings.

In the drawings: A and A' designate pump tubing sections joined by flange rings B and B', as is usual in the building up of pump tubing.

1 designates the top member of my shaft bearing which is set into the flange rings B and B', the said top member having a transverse web 2, and ports 3, through which water may pass when forced upwardly in the pump tubing. The top member 1 supports a sleeve 4 containing a vertical cavity 5, providing an annular space around the pump shaft, the cavity being open at its upper end and terminating in a base shoulder 6. The sleeve 4 terminates at its lower end in a conical extension 7, with the object in view of lessening retardation of the upward flow of water to and through the ports 3; and, with a similar object in view, I provide V-shaped fins 8, which extend downwardly along the sleeve 4, beneath the web 2 of the top member 1 of my bearing.

9 and 10 designate, respectively, wood and leather antifriction rings located in the cavity 5 of my bearing. These rings being arranged alternately so that a leather ring is interposed between two adjacent wooden rings, or vice versa, within the cavity, with the shaft C in contact with all of the rings. The lowermost antifriction ring rests upon the base shoulder 6 at the bottom of the cavity 5, and all of the rings are confined in said cavity by a gland 11 having a lower extension 12, which is seated in the cavity and bears on the topmost antifriction ring. The gland 11 is held against the antifriction rings by suitable means providing for its adjustment, such, for instance, as screw threaded stems 13 attached to the top member 1 of the bearing, the stems being extended through the gland and being provided with nuts 14, through the medium of which any desired adjustment of the gland may be obtained. The wood rings 9 are preferably made of segments, as seen in Fig. III, but the leather rings 10 may be of non-sectional form, as shown in Fig. IV, the object in making the wood rings of sectional form being to avoid their breakage in slipping them onto the pump shaft, it being obvious that the leather rings being flexible and yielding, there is no necessity of making them sectional.

From the foregoing, it will be understood that the antifriction rings 9 and 10 are confined by the gland extension 12 in the cavity 5 in such manner as to exclude water passing through the pump tubing from flowing into the cavity; but it is obvious that a sufficient supply of moisture may gain access to the cavity in which the antifriction rings are located to keep them sufficiently moist for lubrication, so that wear upon the pump shaft or the antifriction rings will be reduced to a minimum. The wood and leather antifriction rings are, therefore, kept in such condition as to render them very durable.

It will be obvious that a screw threaded connection or a connection of any other suitable form, for uniting the pump tubing sections might be utilized in lieu of the flange rings B and B'; and that, if the screw threaded connection is used, the body of the bearing may be screwed into such connection.

I claim:—

1. The combination with two sections of pump tubing and flange rings secured to said sections and joined to each other, of a bearing comprising a ported top member set into said flange rings, the said top member being formed with a downwardly extending sleeve provided with a cavity, antifriction means in said cavity, and a gland adjustably secured to said top member and extending into said cavity.

2. The combination with two sections of pump tubing and flange rings secured to said sections and joined to each other, of a bearing comprising a ported top member set into said flange rings, the said top member being formed with a downwardly extending sleeve and with downwardly extending fins interposed between the sleeve and the lower tubing section to centralize the bearing, the top member and its sleeve being provided with a cavity, antifriction means in said cavity, and a gland adjustably secured to said top member and extending into said cavity.

JOSEPH H. GWATHMEY.

In the presence of—
R. C. HILLIARD,
J. V. HEGWOOD.